Patented July 19, 1949

2,476,687

UNITED STATES PATENT OFFICE 2,476,687

THERAPEUTIC CHEWING GUM

Jennings A. Smith, Memphis, Tenn., assignor to Southern Research Laboratories, Memphis, Tenn., a corporation of Tennessee No Drawing. Application November 18, 1946, Serial No. 710,405

7 Claims. (Cl. 167—82)

The present invention relates to therapeutically active chewing gums having primary utility in dental therapy. Such therapy is applicable under conditions where it is desirable to massage gums which tend to recede, or teeth are loose, by use of chewing gum of therapeutically controlled hardness for the desired effect; and, where active infection of the mouth is present, to use therapeutic chewing gum having an active bacteriacide of prolonged activity such as a colloidal or otherwise suspended silver substance.

It is accordingly a primary object of the present invention to formulate a chewing gum of therapeutic activity for common dental purposes.

It is a further object of this invention to impart therapeutic properties to chewing gum by the addition thereto of bacteriacidally active silver compounds or other reduction products, either dissolved, suspended, or dispersed in the gum.

It is a further object to compound a therapeutic chewing gum of controlled hardness or chewability.

It is also an object of this invention to use a wax blending base in which a controlled quantity of silver compound is incorporated, and in which the final product is of controlled or predetermined hardness.

In accordance with these principles, a wax base is selected of controlled hardness either to be used alone, in some cases, or as a blending agent for controlling the hardness of other gum materials. Where bacteriacidal properties are included in the gum, the wax is selected as a carrier to be capable of dissolving, reducing, or maintaining in suspension a controlled quantity of a silver compound.

Such wax, natural or synthetic, is either partially unsaturated or contains free alcohol or other groups capable of reducing the silver salt. Waxes such as beeswax or carnauba wax are eminently suitable. Other waxes such as saturated paraffin wax without natural silver-salt-reducing properties may be used as a blend with a reducing wax to facilitate control of hardness thereof, and in the final blended chewing gum. Waxes, not inherently reducing, as saturated paraffin wax, may also be used together with substances other than waxes which supply the necessary reducing properties for the silver salt. For example, blends of paraffin wax with organic sugars have been found to be satisfactory. It will also be understood that direct chemical precipitation, with or without further reduction of the silver salt, may be first effected before addition to any wax, in order to prepare a wax containing reduced silver salt.

The wax containing the suspension or dispersion of silver compounds is prepared to have a definite hardness, so that when it is subsequently blended with conventional gums, a chewing gum of the desired degree of hardness is obtained. For example, it may be desired to prepare a chewing gum of greater than ordinary hardness or chewability. For such purposes a hard blend is first prepared so that by blending a definite proportion thereof with the gums, a final chewing gum, harder than usual due to its hard wax content, is obtained. Again it may be desired to have a chewing gum that is softer than usual, in which case a soft wax or blend of waxes is used as a blending agent with the gums. Conventional gums such as chicle, pontianak, gutta soh, gum katiaw, latexes, jelutong, etc. are used for blending with wax. While most of the gums listed are natural, it will be understood that synthetic gums such, for example, as synthetic latexes will also be useful.

The following table shows generally how gums are blended to a wax free gum base which will subsequently be blended with 5 to 85% of wax base to form the completed gum:

|    | Chicle | Pontianak | Gutta Katiaw | Gutta Soh | Dry Jelutong | Dry Latex | Balsams |
|----|--------|-----------|--------------|-----------|--------------|-----------|---------|
| 1  | ----   | 46        | 44           | 8         | ----         | ----      | ----    |
| 2  | ----   | 44        | 42           | 7         | ----         | ----      | ----    |
| 3  | 74     | ----      | ----         | ----      | ----         | ----      | 8       |
| 4  | ----   | ----      | ----         | ----      | 92           | ----      | ----    |
| 5  | ----   | ----      | ----         | ----      | ----         | 15        | ----    |
| 6  | ----   | ----      | ----         | 15        | ----         | ----      | ----    |
| 7  | 77     | ----      | ----         | ----      | ----         | ----      | 3       |
| 8  | ----   | ----      | ----         | ----      | ----         | ----      | 75      |
| 9  | ----   | ----      | ----         | ----      | ----         | ----      | 62      |
| 10 | ----   | ----      | ----         | ----      | ----         | ----      | 70      |
| 11 | ----   | ----      | ----         | ----      | ----         | ----      | 50      |
| 12 | 76     | ----      | ----         | ----      | ----         | ----      | ----    |
| 13 | ----   | ----      | ----         | ----      | ----         | ----      | 100     |
| 14 | ----   | ----      | ----         | ----      | ----         | 30        | ----    |

Thus, for example, a typical wax free gum base by proper selection of constituents would have the following constituents for subsequent hardness control:

| Soft | Medium | Hard |
|------|--------|------|
| Chicle, 100% | Pontianak, 46%<br>Gutta Katiaw, 44%<br>Chicle, 10% | Pontianak, 35%<br>Gutta Katiaw, 30%<br>Gutta Soh, 10%<br>Dry Latex, 25% |

Such gum is then blended with 5 to 85% of waxes to obtain the desired hardness. Where a bacteriacidal effect alone is desired, the wax may be of moderate hardness and the silver compound is incorporated to be used directly for chewing or blended with other gums as above. In such case, the wax is made up as a concentrate and blending base. Hence the bacteriacidal agent is distributed therein as a concentrate depending on how much the base wax is to be diluted. Such concentrates are made up, therefore, in accordance with the desired and intended dilution, the concentration of reduced silver salt therein being variable from one part of a silver compound to 500 to 100,000 parts of wax carrier.

A typical wax concentrate for ordinary gum would be

| | |
|---|---|
| Beeswax | 10% by weight |
| Paraffin wax | 90% by weight |
| Silver nitrate | Q. S. to give 1 part in 30,000 |
| Oil of peppermint | Q. S. to flavor |

Example I

One gram of silver nitrate powder is vigorously ground in a mortar with ten grams of beeswax for one hour and then allowed to stand for 24 hours. One cc. of water is then added and the mixture further ground for another hour. As the reduction proceeds, the mixture becomes darker and finally reaches a rich chocolate brown. This mixture is then added to a melted blend of waxes such as the wax mixture mentioned above in proportion to give one part of reduced silver salt to 30,000 of the wax.

Example II 3.2 grams of silver nitrate is dissolved in 200 cc. of water (chlorine free) and the silver is precipitated by addition of 5 grams of caustic soda dissolved in 80 cc. of water. The suspension is kept below the boiling point in order to form as much silver hydroxide (as distinguished from silver oxide) as is possible. The precipitate is recovered on a filter paper and added while moist to 97 grams of beeswax. The wax mixture is heated to and held at 212° F. until the moisture is evaporated. The wax is then heated to 250° F. when the silver hydroxide appears to react with the wax to form organic silver salts soluble in paraffin wax. At this point, the wax containing silver is a concentrate, and may be kept as such for further blending with other wax for hardness control and with gums in concentrations varying from one part in 500 to 100,000 of blend.

The silver compound used herein may be a definite silver compound or a mixture of silver-containing substances. As noted above, certain salts may either react with the wax or other gum materials and/or be reduced thereby to one or more silver derivatives or reduction products. The ultimate silver substance is dissolved or suspended in the gum in an unknown chemical state that may include colloidal silver compounds and colloidal metallic silver which have only limited solubility in saliva, so that the bacteriacidal effect of the silver ingredient will be retained in the gum during prolonged periods of chewing.

Many variations of the principle hereof will be apparent to one skilled in the art, for example, other blending methods and various silver reacting substances may be used as well as a wide variety of waxes to obtain a desired product, and it is intended that the disclosure herein be interpreted as broadly as recited in the claims.

I claim:

1. Method of forming a dental therapeutically active chewing gum of controlled hardness comprising forming a wax blend of desired hardness containing organic reducing components, mixing 500 to 100,000 parts thereof by weight with one part of a reducible silver salt to form a homogeneous blend of organic reduced silver compounds in said wax and blending said active wax blend in proportion of 5 to 85% of the blend with gums.

2. Dental therapeutic chewing gum comprising 500 to 100,000 parts by weight of an organic reducing wax having one part of a reducible silver compound homogeneously blended therewith and which has been reacted and reduced in situ therein.

3. Composition as defined in claim 2 wherein the reducing wax is beeswax.

4. Dental therapeutic chewing gum comprising a gum base blended with 5 to 85% of an organic reducing wax having a small quantity of a reducible silver compound homogeneously distributed, reacted with and reduced in situ therein by reaction with said wax, said silver compound being present in proportions of one part of silver compound to 500 to 100,000 parts of gum blend.

5. Method of forming a base concentrate for blending with gum to impart thereto a therapeutic activity as a chewing gum comprising homogeneously mixing and reacting an organic reducing wax with a reducible silver compound in proportion of 500 parts to 100,000 parts of wax to 1 part of silver compound.

6. Method as defined in claim 1 wherein the silver compound is silver hydroxide.

7. Method as defined in claim 1 wherein the silver compound is silver nitrate.

JENNINGS A. SMITH.

REFERENCES CITED

The following references are of record in the file of this patent:

UNITED STATES PATENTS

| Number | Name | Date |
|---|---|---|
| 1,038,227 | Sulzberger | Sept. 10, 1912 |
| 1,807,704 | Pappadis | June 2, 1931 |

OTHER REFERENCES

Weichardt, Chemical Abstracts, vol. 23, page 2489 (1929). (Copy in Scientific Library.)

Weichardt, Klinische Wochenschrift, Feb. 19, 1929, page 362. (Copy in Division 43.)